United States Patent
Koziolek et al.

(10) Patent No.: US 12,038,742 B2
(45) Date of Patent: Jul. 16, 2024

(54) METHOD FOR ALARM HANDLING IN A PROCESSING SYSTEM

(71) Applicant: ABB Schweiz AG, Baden (CH)

(72) Inventors: Heiko Koziolek, Karlsruhe (DE); Julius Rueckert, Langen (DE); Benedikt Schmidt, Heidelberg (DE); Benjamin Kloepper, Mannheim (DE)

(73) Assignee: ABB Schweiz AG, Baden (CH)

( * ) Notice: Subject to any disclaimer, the term of this patent is extended or adjusted under 35 U.S.C. 154(b) by 177 days.

(21) Appl. No.: 17/228,736

(22) Filed: Apr. 13, 2021

(65) Prior Publication Data
US 2021/0318675 A1 Oct. 14, 2021

(30) Foreign Application Priority Data

Apr. 14, 2020 (EP) ..................................... 20169418
Mar. 31, 2021 (EP) ..................................... 21166172

(51) Int. Cl.
*G05B 19/04* (2006.01)
*G05B 19/418* (2006.01)
(Continued)

(52) U.S. Cl.
CPC ... *G05B 19/41865* (2013.01); *G05B 19/4183* (2013.01); *G05B 19/41885* (2013.01);
(Continued)

(58) Field of Classification Search
CPC ........... G06Q 20/3678; G06Q 10/0637; G06Q 10/00; G05B 13/0265; G05B 2219/23126;
(Continued)

(56) References Cited

U.S. PATENT DOCUMENTS 8,332,773 B2 12/2012 Husoy et al.
10,031,654 B2 7/2018 Hams et al.
(Continued)

FOREIGN PATENT DOCUMENTS

CN 106452927 A 2/2017
EP 1768005 B1 11/2011

OTHER PUBLICATIONS

Wusthoff et al., CN 101295380, "Method and System for Estimating Resource Supply" (translation) Apr. 12, 2017, 26 pgs <CN_101295380.pdf>.*

(Continued)

*Primary Examiner* — Tuan A Vu
(74) *Attorney, Agent, or Firm* — Leydig, Voit & Mayer, Ltd.

(57) ABSTRACT

A method for providing an attribute of an element in a processing system having a plurality of elements, the processing system being represented as a directed graph having a plurality of nodes and directed edges, each node representing an element, each node having an attribute, and each directed edge representing a relation between two elements of the plurality of elements, the method including: selecting one node of the plurality of nodes as a starting node; constructing a subgraph, the subgraph including all the nodes that are forward-connected by at least one directed edge from the starting node; and outputting all nodes and the attribute of the nodes of the subgraph.

15 Claims, 2 Drawing Sheets

(51) Int. Cl.
*G06N 3/08* (2023.01)
*G06Q 10/0637* (2023.01)
*H04L 41/12* (2022.01)
*G06F 16/901* (2019.01)
*G06Q 10/00* (2023.01)

(52) U.S. Cl.
CPC ........... *G06N 3/08* (2013.01); *G06Q 10/0637* (2013.01); *H04L 41/12* (2013.01); *G05B 2219/23126* (2013.01); *G05B 2219/23157* (2013.01); *G05B 2219/24103* (2013.01); *G05B 2219/31469* (2013.01); *G06F 16/9024* (2019.01); *G06Q 10/00* (2013.01)

(58) Field of Classification Search
CPC ........... G05B 2219/24103; G05B 2219/31469; G05B 19/41865; G05B 19/4183; G05B 19/41885; G06K 7/10366; G06F 16/90335; G06F 16/9024; G06N 5/022; G06N 3/08; G06N 20/00; H04L 41/12
See application file for complete search history.

(56) References Cited

U.S. PATENT DOCUMENTS

| | | | |
|---|---|---|---|
| 10,176,606 B2 | 1/2019 | Jammikunta et al. | |
| 10,235,853 B2 | 3/2019 | Kurella et al. | |
| 10,372,572 B1 | 8/2019 | Kesarwani et al. | |
| 11,201,890 B1* | 12/2021 | Coull | G06F 16/9024 |
| 2010/0313074 A1 | 12/2010 | Dang Duc et al. | |
| 2013/0235041 A1 | 9/2013 | Bierweiler et al. | |
| 2017/0124481 A1* | 5/2017 | Crabtree | G06Q 10/0637 |
| 2017/0310552 A1 | 10/2017 | Wallerstein et al. | |
| 2018/0173173 A1* | 6/2018 | Leonard | G05B 13/0265 |
| 2018/0224831 A1 | 8/2018 | Liu et al. | |
| 2018/0330293 A1* | 11/2018 | Kulkarni | G06K 7/10366 |
| 2018/0367557 A1* | 12/2018 | Brown | G06F 16/90335 |
| 2019/0188584 A1* | 6/2019 | Rao | G06Q 10/00 |
| 2020/0002098 A1 | 1/2020 | Eickhoff | |
| 2020/0036595 A1* | 1/2020 | Wallerstein | H04L 41/12 |
| 2020/0166909 A1* | 5/2020 | Noone | G06N 20/00 |
| 2020/0169483 A1* | 5/2020 | Kursun | G06Q 20/3678 |
| 2020/0356878 A1* | 11/2020 | Lakshmipathy | G06N 5/022 |

OTHER PUBLICATIONS

Xiao et al., CN 107504506, (translation), Apr. 23, 2019, 17 pgs <CN_107504506.pdf>.*

Hou et al., CN 106452927, (translation) Feb. 22, 2017, 8 pgs <CN_106452927.pdf>.*

Urbas L. et al., "autoHMI: a model driven software engineering approach for HMIs in process industries," 2011 IEEE International Conference on Computer Science and Automation Engineering, Jun. 2011, pp. 627-631, IEEE, Shanghai, China.

Urbas L. et al., "Towards context adaptive HMIs in process industries," 9th IEEE International Conference on Industrial Informatics, Jul. 2011, pp. 244-249, IEEE, Lisbon, Portugal.

Bloch H. et al., "Model-based engineering of CPPS in the process industries," IEEE 15th International Conference on Industrial Informatics (INDIN), Jul. 2017, pp. 1153-1159, IEEE, Emden, Germany.

Schmitz S. et al., "Automated engineering of Human Machine Interfaces," 2007, pp. 127-138, VDI Berichte 1980, Germany.

Doherr F. et al., "Bedienbilder auf Knopfdruck Modellbasierte Erzeugung von Fliessbilddarstellungen," atp magazin Nov. 2011, Sep. 2011, pp. 30-39. apt magazin, Germany.

Andreas Berlet, "Konzept für ein Assistenzsystem zur Lokalisierung von Störungsursachen in Prozessanlagen mit Hilfe von objektorientierten Topologiemodellen," Dec. 2020, pp. 1-126, Pforzheim University, Pforzheim, Germany.

European Patent Office, Office Action in European Patent Application No. 21166172.3, 7 pp. (dated May 10, 2023).

European Patent Office, Extended European Search Report in European Patent Application No. 21166172.3, 10 pp. (Sep. 9, 2021).

* cited by examiner

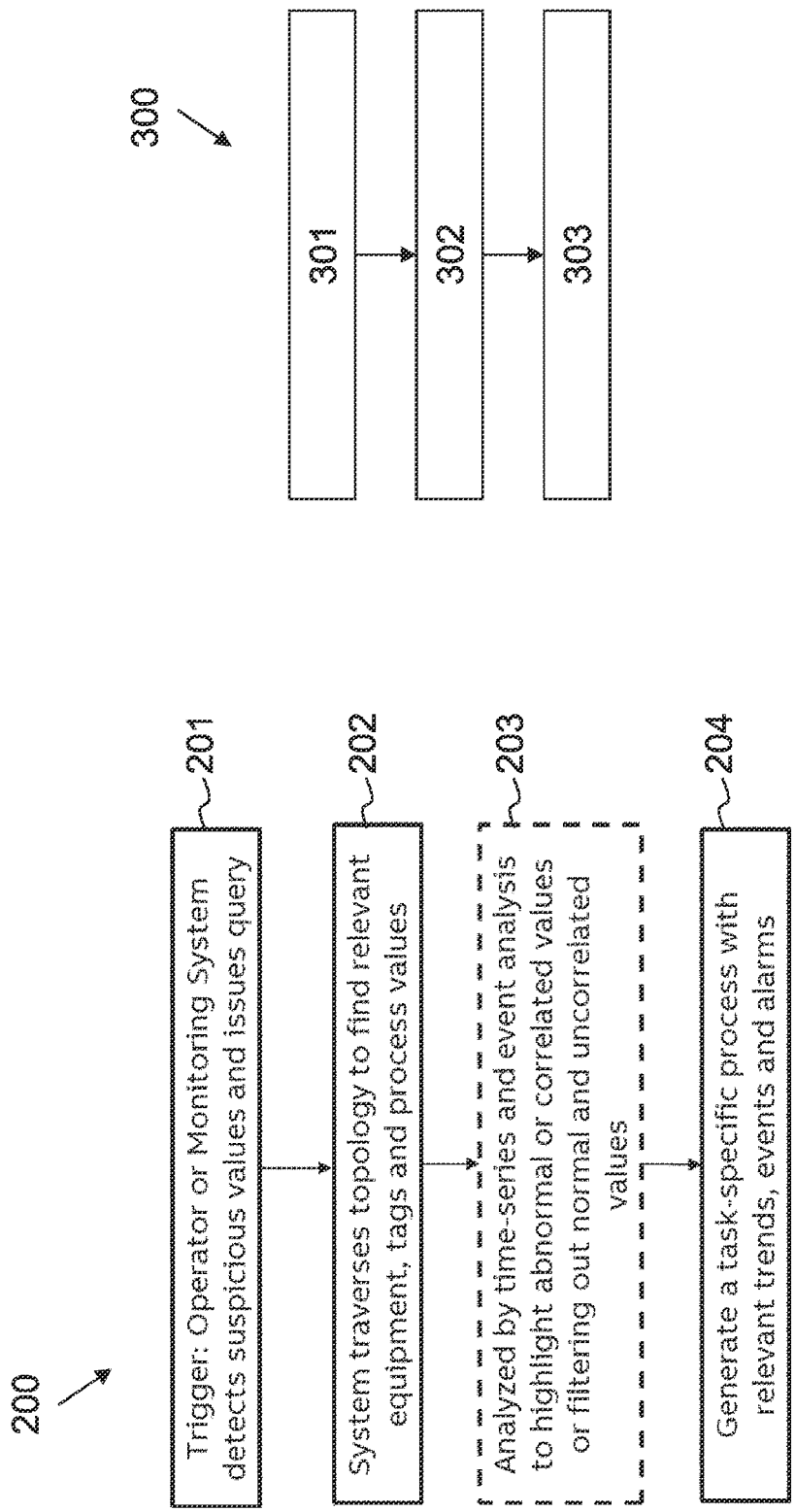

METHOD FOR ALARM HANDLING IN A PROCESSING SYSTEM

CROSS-REFERENCE TO PRIOR APPLICATION

Priority is claimed to European Patent Application No. EP 20 169 418.9, filed on Apr. 14, 2020, and to European Patent Application No. EP 21 166 172.3, filed on Mar. 31, 2021. The entire disclosure of both applications is hereby incorporated by reference herein.

FIELD

The invention relates to the field of alarm handling in an industrial plant or a processing system, particularly for processing systems that can be represented as a graph. The invention further relates to a computer program product, a computer-readable storage medium, and to a use of the method.

BACKGROUND

Plant operations staff, e.g. operators, process engineers, automation engineers, or dispatchers, frequently need to get an overview of the status of the plant or production process, particularly in cases of alarms or in an otherwise crucial or interesting phase during the plant's operation. In some cases, it may be useful to get a better understanding of data of the processing system and/or of a topology of the plant and/or a connectivity of the plant's process elements.

SUMMARY

In an embodiment, the present invention provides a method for providing an attribute of an element in a processing system comprising a plurality of elements, the processing system being represented as a directed graph comprising a plurality of nodes and directed edges, each node representing an element, each node having an attribute, and each directed edge representing a relation between two elements of the plurality of elements, the method comprising: selecting one node of the plurality of nodes as a starting node; constructing a subgraph, the subgraph comprising all the nodes that are forward-connected by at least one directed edge from the starting node; and outputting all nodes and the attribute of the nodes of the subgraph.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 schematically shows a flow chart of a method according to an embodiment;

FIG. 3 schematically shows a flow chart of a further method according to an embodiment.

DETAILED DESCRIPTION

Figure 1:
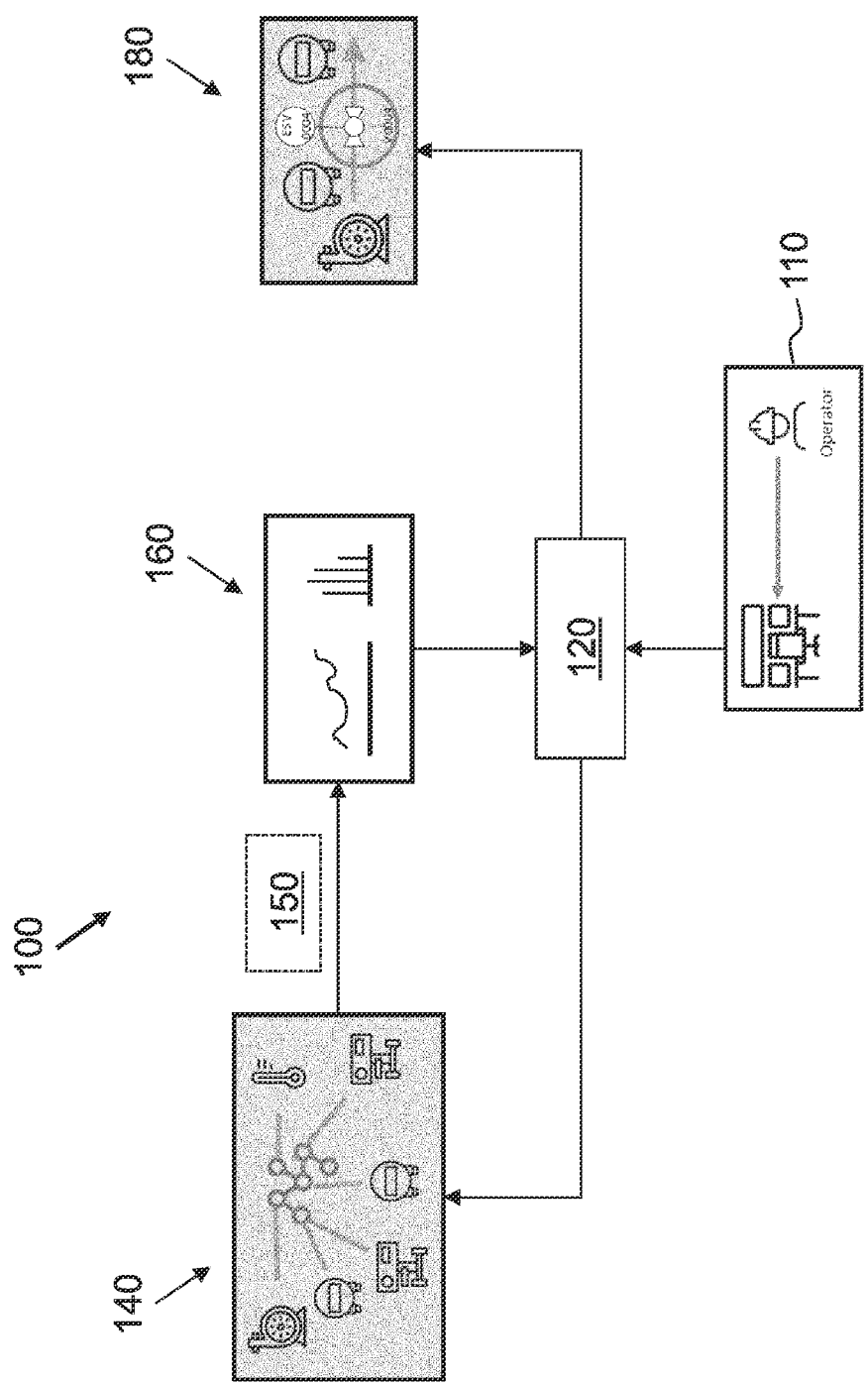
FIG. 1 schematically shows an example of identifying a problem by monitoring process values and alarms in a process control system according to an embodiment.

In an embodiment, the present invention provides a method to get a status or another attribute of at least some of the elements of interest in a plant or production process.

One aspect relates to a method for providing an attribute of an element in a processing system comprising a plurality of elements, wherein the processing system is represented as a directed graph comprising a plurality of nodes and directed edges, and wherein each node represents an element, each node has an attribute, and each directed edge represents a relation between two elements of the plurality of elements. The method comprises the steps of:

selecting one node of the plurality of nodes as a starting node;

constructing a subgraph, wherein the subgraph consists of all the nodes that are forward-connected by at least one directed edge from the starting node; and outputting all nodes and the attribute of the nodes of the subgraph.

An element or process element in or of a processing system, particularly an industrial processing system, may comprise, for instance, pumps, compressors, vessels or pressure vessels, tanks, heat exchangers, furnaces, fans, cooling towers, valves, etc.

An attribute of a node—which represents an element—may comprise a "status" of the node, e.g. a process value like temperature, pressure, and the like, and/or a compound or derived value, such as "safe, critical, dangerous, damaging, . . . "; this may comprise a categorization of the attribute(s). Each one of the nodes comprises or has an attribute. The attribute may be constant or empty. The attribute may comprise one attribute, a plurality of attributes, and/or a list of attributes.

Selecting one node as a starting node may comprise to select one or more arbitrary nodes, the selection may be triggered or motivated by an alarm or may be done to get a piece of information for some insights into the plant or production process. Constructing the subgraph may comprise to follow or proceed forward along the directed edges, from the starting node to a terminating node or to a node that has already been touched, e.g. in a cycle.

Outputting all nodes and the attribute of the nodes of the subgraph may comprise to display or transmit a list of these nodes and its attributes, and/or to perform some post-processing, for example to display the subgraph as a topology-diagram with coloured nodes, the colour e.g. depending on its current criticality, and/or to present the topology-diagram as an interactive diagram, for instance with "clickable nodes" that show upon request a list of attributes.

This may contribute to provide a fast and clear overview about a current state of the plant or production process. It may help to step quickly into an evaluation procedure and/or to get fast access to process data, e.g. by the visualisation and the interactive display of relevant attributes and/or further data that may be related to the current state. This may contribute to accelerate repairing, and/or for fast reactions in alarm situations, for instance by analysing which process parts need to be switched off or can be run in safe parameter ranges. Further examples may comprise to conduct efficiency investigations, e.g. how to improve the efficiency of a heat exchanger, incident handling e.g. a failure of a compressor in compressor station, root cause analysis of defects or crucial situations, and/or further actions or uses. This may, e.g., be helpful in situations, when plant operations staff want to browse life data of a plant, for instance to analyse the current state with respect to a given or desired one. This may further contribute to be aware of the process topology for a well-guided proceeding. Furthermore, time and costs may be reduced, for tasks like manual anomaly investigation, complex and multi-device equipment failure mitigation, and/or root-cause analysis.

In various embodiments, the method further comprises the step of outputting a subset of the process values of the directed graph, wherein at least one attribute of at least one node of the directed graph is a process value. The outputting may comprise to display, visualize transmit, post-process the attribute(s), for instance on an alarm-screen, an analysis module, and/or other actions.

In various embodiments, the selected node has an attribute that relates to an alarm.

"Relate" may comprise to have been triggered or motivated by an alarm. An example may be an increased pressure that has become critical, and the method shows, e.g. to the operator, what elements are influenced by this node. Or, for example, if an increased temperature (i.e. attribute) of a vessel is indicated as alarm-trigger, to start the subgraph from the process element vessel. The alarm may comprise a compound or derived value, such as a categorization, e.g. of a pressure or temperature, as "safe/critical/dangerous/damaging".

In various embodiments, the alarm is provided by analysing a time series of process values. For example, the alarm-trigger may not be a current state, but, e.g., may depend on a rapid change of a temperature, pressure, etc. This may be performed by a module that uses one or more time-series and event analyses to highlight particularly relevant equipment and process values in dynamically generated process graphics.

In some embodiments, the analysing is performed by an artificial neural net, ANN. The ANN may be trained by offering known time-series, for example time-series that are or have been related to an alarm. This may advantageously contribute to easier differentiate a critical increase of a temperature (etc.) from a non-critical one. The training—and/or the application of the trained ANN—may comprise to use a time-series and event analysis that, e.g., uses standard anomaly detection methods (Local-Outlier-Factor, One-Class-SVM, AutoEncoder, and/or further ones) to identify process values and events that should be displayed, and/or highlighted to the operator. The training may comprise an analysis of historical persistent disturbance, in particular of oscillatory disturbance. Further method, e.g. for getting additional insight on causality and timing is to analyse the cross-correlation and cross-entropy function around changes of the setpoint changes, in order to find out how strong a change propagates and how long it takes to propagate. A cross-correlation may exist, as an example, between a pressure increase in one element and a pressure decrease in one element. Hence, the machine learning by analysing time-series and event data may contribute to highlight interesting and relevant data points to the operator, for instance particularly relevant equipment and process values in dynamically generated process graphics.

In some embodiments, the time series of process values comprises historical data. Using historical data may provide a change to consider a development of crucial data, thus considering a piece of "future", when applied to a current situation or process value. Particularly, an analysis of historical persistent disturbance—in particular oscillatory disturbance—by means of e.g. cross-correlation analysis or cross-entropy may improve the quality of the alarm handling.

In various embodiments, the method further comprising the step of outputting a process status of the processing system, wherein the process status comprises at least one of: the subgraph, the process values of the directed graph, and/or the time series of process values.

The process status may be an indicator of a state of the complete processing system, or of a subsystem, e.g. of the subsystem defined by the subgraph. The process status is generated, possibly displayed and/or transmitted. This may include process equipment, process values, alarms and events relevant for the current analysis task. Process topology information may be derived from process flow diagram and made available during plant runtime, as described above and/or below.

There may be scenarios, in which information is spread across many screens and different data sources, such as process history, process flow diagram(s), and/or control system descriptions. Then, operators may need to switch between different screens displaying different parts of the process in order to collect all relevant information. This switching may make the task of alarm analysis challenging, because the operators needs to memorize all relevant information while switching between the screens. In such scenarios, the collection of the information may become time-consuming, error-prone and exhausting for the operations staff. Embodiments described here may use computer readable process topology information and process control system information, traverse the topology to identify relevant subgraphs, use machine learning methods like anomaly detection for time-series and event analysis to highlight relevant process values and events or filter out irrelevant ones and may generate a task specific graphical representation of the subgraph with embedded trend and event visualization and/or may generate task-specific user interfaces, such as operator screens. An embodiment may be also suitable for small screens. An embodiment may provide an API to access topology information along with live process values and process control system equipment properties. The information provided may further be used for a root-cause analysis of alarms and/or crucial situations.

In some embodiments, the processing system is represented by a process flow diagram, PFD, and/or a piping and instrumentation diagram, P&ID diagram. The PFD (etc.) may be used as a base for the directed graph comprising a plurality of nodes and directed edges. It may further be useful, that exchange formats for smart P&IDs have been standardized. This advantageously provides a common format for describing the process or the plant.

An aspect relates to a computer program product comprising instructions, which, when the program is executed by a computer, cause the computer to carry out the method as described above and/or below.

An aspect relates to a computer-readable storage medium where a computer program or a computer program product as described above is stored on.

An aspect relates to a use of a method as described above and/or below for an efficiency investigation of a plant or a subsystem, for an access, particularly for a fast access, to process data, and/or for incident handling of an element. This may contribute to accelerate repairing, and/or for fast reactions in alarm situations.

An aspect relates to an industrial plant or a processing system, comprising a computer on which instructions are stored, which, when the program is executed by the computer, cause the computer or the industrial plant to carry out the method as described above and/or below.

For further clarification, embodiments of the invention are described by means of embodiments shown in the figures. These embodiments are to be considered as examples only, but not as limiting.

FIG. 1 schematically shows an example of identifying a problem by monitoring process values and alarms in a process control system 100 according to an embodiment. An automated monitoring system 110—or an operator—may identifies a problem, e.g. by monitoring process values and alarms in the process control system 100. This issues an agent 120, in order to find some context and/or further information related to the problem, for instance to find related process values and process equipment or elements. The agent 120 executes a query to module 140, to get process topology and/or further information. The query may be specified based on connectivity information in the process flow, all meta information from a PFD or a smart P&ID diagram—such as media type, pipe diameter, alarm levels, etc. —, and attributes (e.g. equipment properties) derived from the process control system. Then, one node in a directed graph related to the topology description is selected as a starting node. From this, the directed graph is traversed to construct a subgraph 150, thus finding related process values and equipment tags, i.e. nodes and its attributes.

The list of identified process values and process tags may be passed to an (optional) time-series and event analysis module 160 that uses standard anomaly detection methods—e.g. Local-Outlier-Factor, One-Class-SVM, AutoEncoder—to identify process values and events that should be highlighted to the operator. The time-series and event analysis may also use standard methods for correlation and/or cross-correlation analysis to identify process values that probably have a causal relationship with identified untypical process value or event, e.g. by combining the information about cross-correlation and the relationship in the topology. The results of the modules 140 and/or 160 are pass to display, visualization, or task-specific user interface 160, to provide a fast, and in some embodiments an interactive, analysis and/or evaluation of the alarm or situation of interest.

FIG. 2 schematically shows a flow chart 200 of a method according to an embodiment. In a step 201, a trigger is sent by a system and/or operator. In a step 202, a query is performed, for which a directed graph related to the system's topology is traversed, for constructing a subgraph. In an optional step 203, a time-series and event analysis is performed. This is to highlight abnormal and/or correlated values, and/or for filtering out normal and/or uncorrelated values, thus reducing advantageously the information that may be provided to a human operator. In a step 204, a task-specific process and/or user interface is generated, which reflects relevant trends, event, and alarms.

FIG. 3 schematically shows a flow chart 300 of a method for providing an attribute of an element in a processing system comprising a plurality of elements, wherein the processing system is represented as a directed graph comprising a plurality of nodes and directed edges, wherein each node represents an element, each node has an attribute, and each directed edge represents a relation between two elements of the plurality of elements. In a step 301, one node of the plurality of nodes is selected as a starting node. In a step 302, a subgraph is constructed, wherein the subgraph consists of all the nodes that are forward-connected by at least one directed edge from the starting node. In a step 303, all nodes and the attribute of the nodes of the subgraph output, i.e. displayed, visualized, and/or a task-specific user interface is generated.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for providing an attribute of an element in an industrial plant or an industrial processing system comprising a plurality of elements, the elements comprising actuators and/or sensors of the industrial processing system, the processing system being represented as a directed graph which is based on a process flow diagram (PFD) and/or a piping and instrumentation diagram (P&ID), the directed graph comprising a plurality of nodes and directed edges, each node representing an element, each node having an attribute, and each directed edge representing a relation between two elements of the plurality of elements, the method comprising:

receiving, from a monitoring system and/or operator, an alarm;

querying, based on the received alarm, the directed graph to obtain data of the directed graph related to the alarm;

selecting one node of the plurality of nodes as a starting node, wherein the selected one node relates to the alarm;

constructing a subgraph based on the obtained data of the directed graph and a relation of the obtained data to the selected one node, the subgraph comprising all the nodes that are forward-connected by at least one directed edge from the starting node; and outputting all nodes and the attribute of the nodes of the subgraph, wherein the attribute of each one of the nodes represents a status or process value of the corresponding element for analyzing which process parts need to be switched off or can be run in safe parameter ranges.

2. The method of claim 1, further comprising:
outputting a subset of the process values of the directed graph.

3. The method of claim 1, wherein the selected node has an attribute that relates to the alarm.

4. The method of claim 3, wherein the alarm is provided by analyzing a time-series of process values.

5. The method of claim 4, wherein the analyzing is performed by an artificial neural net (ANN).

6. The method of claim 4, wherein the time-series of process values comprises historical data.

7. The method of claim 6, wherein selecting the one node as the starting node further comprises:

selecting the one node of the plurality of nodes as the starting node based on an alarm-trigger of the alarm based on the time-series of process values and the historical data.

8. The method of claim 1, further comprising:
outputting a process status of the processing system,
wherein the process status comprises at least one of: the subgraph, the process values of the directed graph, and/or the time-series of process values.

9. A computer program product comprising instructions, which, when the computer program is executed by a computer, cause the computer to carry out the method according to claim 1.

10. A computer-readable storage medium on which the computer program according to claim 9 is stored.

11. A method, comprising:
using the method according to claim 1 for an efficiency investigation of a plant or a subsystem, for an access to process data, and/or for incident handling of an element.

12. An industrial plant or a processing system, comprising:
a computer, on which instructions are stored and which, when the instructions are executed by the computer, cause the computer, the industrial plant, or the processing system to carry out the method according to claim 1.

13. The method of claim 1, wherein the method further comprises constructing the directed graph comprising the subgraph before selecting the one node as the starting node, and wherein constructing the subgraph further comprises:
in response to selecting the one node as the starting node, constructing the subgraph comprising only those nodes of the plurality of nodes that are forward-connected by at least one directed edge from the starting node.

14. The method of claim 1, wherein the elements further comprise a physical process element or physical component of the industrial processing system.

15. The method of claim 1, wherein the attribute of each node is a physical process value of the element of the respective node, or a value derived from the physical process and a physical feature of the element of the respective node.

* * * * *